No. 866,381. PATENTED SEPT. 17, 1907.
R. McCLASKEY.
ADJUSTABLE CALK HORSESHOE.
APPLICATION FILED JULY 5, 1907.
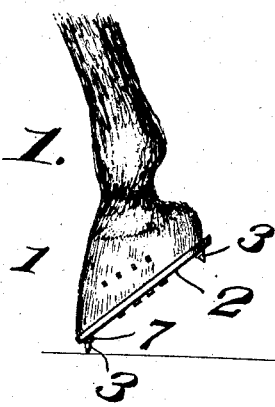
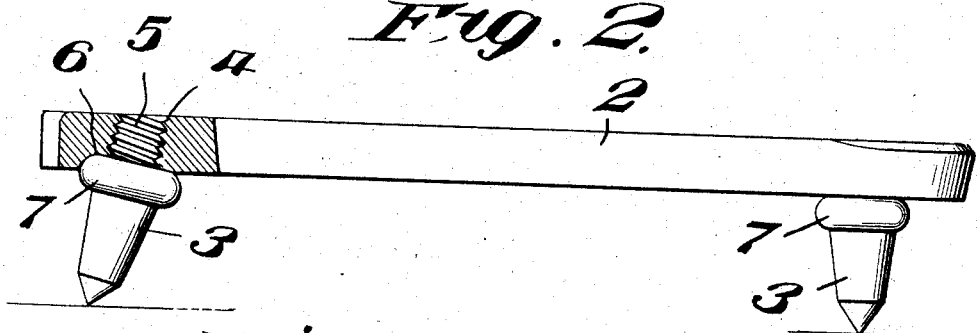
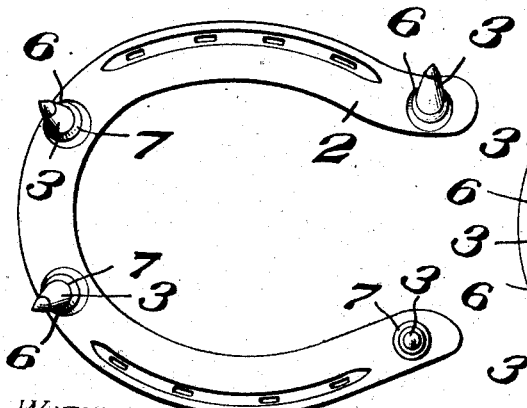
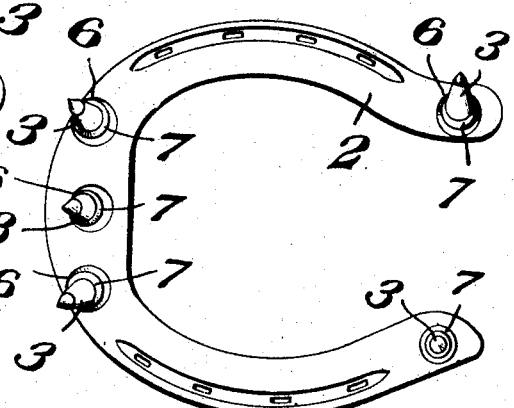
WITNESSES:
INVENTOR
R. McClaskey
By W.J. FitzGerald & Co.
Attorneys

UNITED STATES PATENT OFFICE.

RILEY McCLASKEY, OF BUTTE, MONTANA.

ADJUSTABLE-CALK HORSESHOE.

No. 866,381.  Specification of Letters Patent.  Patented Sept. 17, 1907.

Application filed July 5, 1907. Serial No. 382,310.

*To all whom it may concern:*

Be it known that I, RILEY McCLASKEY, a citizen of the United States, residing at Butte, in the county of Silverbow and State of Montana, have invented certain new and useful Improvements in Adjustable-Calk Horseshoes; and I do hereby declare the following to be a full, clear, and exact description of the invention, such as will enable others skilled in the art to which it appertains to make and use the same.
My invention relates to new and useful improvements in adjustable calk horse shoes, and my object is to provide means for attaching the calks to the shoe, whereby the calks will be brought into proper relationship with the ground to readily engage the same when the animal is stepping forward.

A further object is to place the toe calks in alinement with each other across the toe of the shoe and a still further object is to make the shoes rights and lefts and furnish the same in pairs or sets.
Other objects and advantages will be hereinafter referred to and more particularly pointed out in the claims.

In the accompanying drawings which are made a part of this application, Figure 1 is a side elevation of my improved shoe and calk applied to use to the hoof of an animal. Fig. 2 is a longitudinal central sectional view through the shoe. Fig. 3 is a bottom plan view of the shoe showing the manner of securing the calks thereto, and, Fig. 4 is a similar view showing three of the calks employed at the toe thereof.

Referring to the drawings in which similar reference numerals designate corresponding parts throughout the several views, 1 indicates the hoof of an animal to which is secured in the usual manner my improved form of shoe 2, while 3 indicates my improved form of calk.

In drawing heavy loads, the animal in stepping forward strikes the toe of the hoof to the ground first and as the toe calks as now applied to the shoes are directed at right angles to the horizontal plane of the shoe, the front face of the calk strikes the earth before the lower edge thereof has a chance to engage and enter the ground, thereby unnecessarily wearing the calk and at the same time allowing the hoof of the animal to slip to a certain degree, and to this end I secure the toe calks to the shoe in such manner that when the hoof is being lowered into engagement with the ground, and is at an angle thereto, the calk will be substantially in a vertical position and ready to engage and enter the ground, and in securing the calks to the shoes, I provide openings 4 at the toe and heels of the shoe, which are interiorly threaded and adapted to receive the threaded stems 5 of the calks, and in securing the calks to the shoe so that they will positively engage the ground when the animal is lowering its hoof.
The toe calks are preferably inclined upwardly and outwardly, which is accomplished by directing the openings 4 at an angle through the toe of the shoe and providing a tapered cavity 6 in the lower surface of the shoe and surrounding the opening 4 in which is seated the upper end of the calk, a rib 7 being formed at the juncture between the calk and stem 5, thereby providing a firm bearing for the upper end of the calk.

In Fig. 3 of the drawing I have shown the shoe as provided with two calks at the toe, said calks being inclined forwardly and outwardly, while in Fig. 4 of the drawing I have shown 3 of the calks at the toe of the shoe, said calks being in alinement with each other across the shoe and the central calk inclined forwardly while the two outer calks are inclined forwardly and outwardly, and as shown in Fig. 1, when the toe of the calk is directed into engagement with the ground by the lowering of the animal's hoofs, the toe calks are in a vertical position or in such position that they will readily enter the ground and prevent the hoof from slipping.

It is my intention to manufacture these shoes in pairs, or sets, and to form the shoes in rights and lefts, thereby obtaining a perfect fit of the shoe and the outer heel of the rear shoe is made slightly greater in length than the inner heel, as the animal in traveling forward gives an outward movement to the hoof as well as a forward movement, thereby striking the outer heel of the shoe against the ground before the inner heel engages the ground, and to this end, therefore, I dispose the calk secured to the outer heel at an outward angle while the calk on the inner heel is in a vertical position or at right angles to the longitudinal plane of the shoe.

The object in providing a plurality of toe calks instead of making the calk solid, is that should the ground be uneven, some one of the toe calks will engage and enter the ground and prevent the foot from slipping, but should the toe calk be made solid and the central portion thereof engage a solid object, the calk would fail to engage any portion of the ground and thereby allow the foot to slip.

It will be understood that by securing the calks to the shoe as described, said calks can be readily removed and replaced by a new calk. It will also be seen that said calks may be readily secured to the shoe without removing the shoe from the hoof of the animal.

It will now be seen that I have provided a very cheap and convenient form of shoe and by constructing the same in pairs, and making the same rights and lefts, a perfect fit is readily obtained, and by making the calks for the toes and heels of the shoe, the same may be readily attached to, or removed from the shoe when desired, and it will also be seen that I have so attached the calks to the shoe that they will be in position to readily enter the ground when the hoof of the animal is at an angle to the ground, thereby preventing any possibility of the hoof slipping.

What I claim is:

1. The combination with a shoe having openings in the toe and heels thereof; of calks, stems on said calks adapted to enter said openings, the toe calks being in alinement across the toe of the shoe and forwardly and outwardly inclined, and a rib surrounding the upper end of said calks adapted to enter a cavity in the bottom of the shoe.

2. The combination with a shoe having an opening in each of the heels thereof and a plurality of openings in the toe of the shoe, a portion of said openings having inclined cavities surrounding the same, a calk for each of said heels, stems on said calks adapted to enter the openings in the heels, one of said calks being inclined outwardly, a plurality of toe-calks having stems thereon, adapted to enter the openings in the toe, said toe calks being in alinement across the toe of the shoe and forwardly and outwardly inclined and a rib surrounding the upper end of said calks adapted to enter the cavities surrounding said openings.

In testimony whereof I have signed my name to this specification in the presence of two subscribing witnesses.

RILEY McCLASKEY.

Witnesses:
F. T. McBride,
Robt. McBride.